(12) United States Patent
Aouadi et al.

(10) Patent No.: US 6,695,393 B1
(45) Date of Patent: Feb. 24, 2004

(54) KINETIC ENERGY ABSORBING RAIL FOR AN AUTOMOTIVE FRAME

(75) Inventors: Fadhel Aouadi, Ann Arbor, MI (US); Hikmat F. Mahmood, Bloomfield Hills, MI (US); Ismail Ozgur Yaman, Dearborn, MI (US); Mohamed Ridha Baccouche, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,107

(22) Filed: Sep. 18, 2002

(51) Int. Cl.⁷ ................................................ B60R 19/00
(52) U.S. Cl. ............. 296/189; 296/203.01; 296/203.02; 296/203.04; 296/205
(58) Field of Search ................. 296/189, 187, 296/205, 203.01, 203.02, 203.04; 280/784; 188/377

(56) References Cited

U.S. PATENT DOCUMENTS

| | | | | |
|---|---|---|---|---|
| 5,048,345 A | * | 9/1991 | Hagiwara et al. | 296/189 |
| 5,100,189 A | * | 3/1992 | Futamata et al. | 296/189 |
| 5,118,160 A | * | 6/1992 | Kitagawa et al. | 296/189 |
| 5,431,445 A | * | 7/1995 | Wheatley | 280/784 |
| 5,462,144 A | * | 10/1995 | Guardiola et al. | 188/377 |
| 5,853,195 A | * | 12/1998 | Le et al. | 280/784 |
| 5,876,078 A | * | 3/1999 | Miskech et al. | 296/188 |
| 6,003,934 A | * | 12/1999 | Usui | 296/203.02 |
| 6,024,341 A | | 2/2000 | Gertz | |
| 6,053,564 A | | 4/2000 | Kamata et al. | |
| 6,203,098 B1 | * | 3/2001 | Motozawa et al. | 296/189 |
| 6,302,476 B1 | * | 10/2001 | Larsson et al. | 296/189 |
| 6,439,650 B2 | * | 8/2002 | Artner et al. | 296/189 |
| 6,511,119 B2 | * | 1/2003 | Takase et al. | 296/189 |

* cited by examiner

Primary Examiner—Dennis H. Pedder
Assistant Examiner—Greg Blankenship

(57) ABSTRACT

A rail (14) for an automotive frame (12) is provided for absorbing kinetic energy in front end crashes. The rail (14) is a metal bar having a front portion and a plurality of indentations (40A, 40B, 40C, 40D) integrally formed therein along the longitudinal axis (42). The indentations (40A, 40B, 40C, 40D) are intended to permit the deformation of the metal bar so as to enhance the absorption of the kinetic energy of a front end crash.

17 Claims, 8 Drawing Sheets

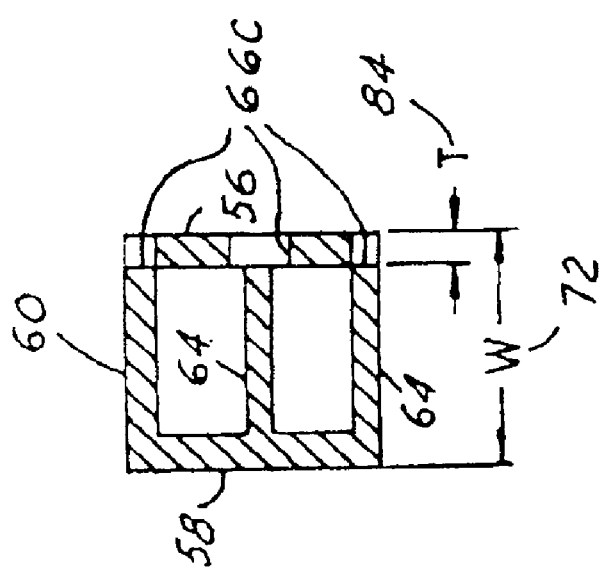

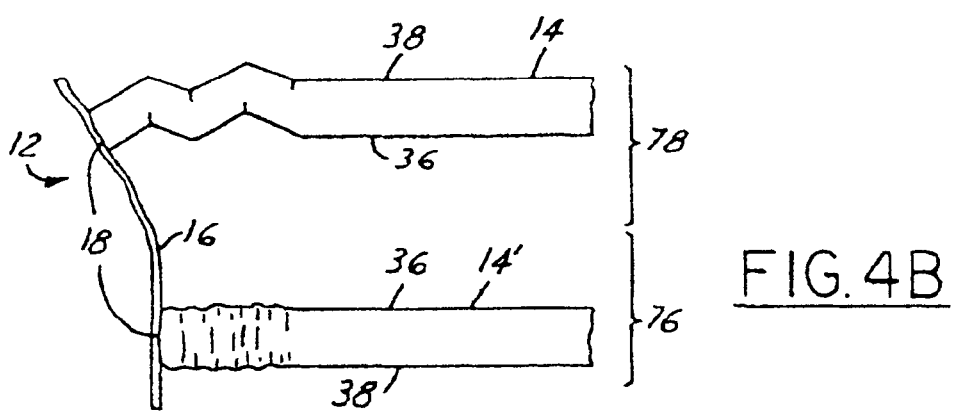

KINETIC ENERGY ABSORBING RAIL FOR AN AUTOMOTIVE FRAME

BACKGROUND OF INVENTION

The present invention relates generally to automotive frames, and more particularly to automotive frames having rails that absorb kinetic energy in front end crashes.

Automotive manufacturers continuously develop devices intended to improve vehicle safety in front end crashes. Moreover, automotive manufacturers are particularly concerned with vehicle safety in front offset crashes on account of the tendency to cause extensive intrusion into the passenger compartment, such as the toe pan area. Intrusion into the passenger compartment increases the risk of serious injury to the occupants of the vehicle. Such a result is clearly undesirable.

It is well known that deformation of the automotive structure can absorb some kinetic energy from the crash. Accordingly, kinetic energy from the crash may be used to bend the automotive structure instead of causing intrusion into the passenger compartment. As a result, the associated risk of injury can be decreased.

Existing rails have structures that do not permit substantial bending. For example, the rails may bend only one time in a front end crash. Consequently, relatively little kinetic energy is absorbed by the rails.

Furthermore, existing rails absorb even less kinetic energy in front offset crashes. In this regard, only the one rail on the impacted side of the vehicle may be deformed. The opposing rail on the non-impacted side of the vehicle is sufficiently rigid that the bumper beam and cross members may detach from the opposing rail before it bends.

Therefore, it would be desirable to increase the amount of kinetic energy absorbed by rails during front end crashes so as to reduce intrusion into the passenger compartment and the associated risk of injury.

SUMMARY OF INVENTION

The present invention provides a rail for an automotive frame that absorbs kinetic energy in front end crashes. The rail is a metal bar having a front portion and a plurality of indentations (such as notches or openings) integrally formed therein along the longitudinal axis. The indentations form weakened sections of the metal bar that allow the metal bar to bend and thus absorb more kinetic energy of a front end crash.

One advantage of the present invention is that the rail reduces intrusion into the passenger compartment, especially the toe pan area, and the risk of injury to occupants of the vehicle.

Another advantage of the present invention is that various kinds of rails having different cross-sections may be employed to absorb the kinetic energy of a crash.

Other advantages of the present invention will become apparent when viewed in light of the detailed description of the preferred embodiment when taken in conjunction with the attached drawings and appended claims.

BRIEF DESCRIPTION OF DRAWINGS

FIG. 3C is a cross-sectional view of the double cell extruded rail as shown in FIG. 3A, the view taken along line 3C—3C in FIG. 3A

FIG. 4B is a top view of the automotive frame shown in FIG. 4A after a 40% offset crash.

DETAILED DESCRIPTION

Figure 1:
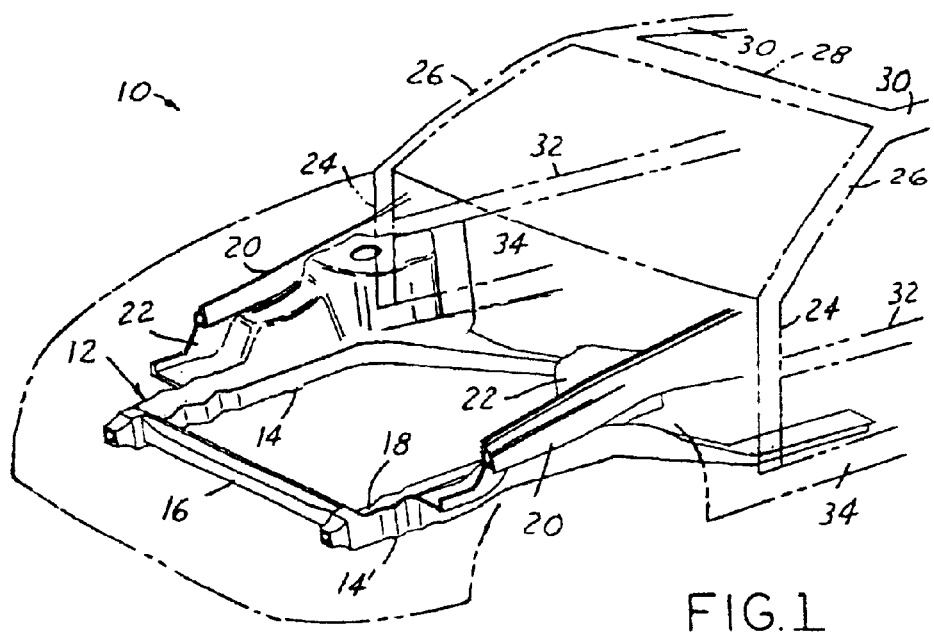
FIG. 1 is a perspective view of a front portion of a vehicle having an automotive frame with kinetic energy absorbing rails integrated therein, in accordance with a preferred embodiment of the present invention.

In the following figures, the same reference numerals are used to identify the same components in the various views.

Referring to FIG. 1, there is shown a perspective view of a front portion of a vehicle 10 having an automotive frame 12 with a pair of rails 14, 14" integrated therein. The rails 14, 14" are the main crash energy absorbing members in the front end structure of the vehicle 10. The rails 14, 14" are attached to each other by a bumper beam 16 at their respective front ends 18. The bumper beam 16 absorbs crash energy in both high and low speed impacts.

Each rail 14, 14" has a second rail member 20 attached thereto by an apron 22. These members 20, also known as shotguns, are upper rails and serve as secondary energy absorbing members. Moreover, each apron 22 is a sheet metal member used to connect the shotguns 20 to their respective rails. The aprons 22 may bend during a crash and absorb a portion of the kinetic energy of the crash.

As is known in the art, the front of the passenger compartment is typically defined by a pair of hinge pillars 24, a pair of A pillars 26, a windshield header 28, a pair of roof side rails 30, a pair of door beams 32, and a pair of rocker members 34.

The passenger compartment may experience extensive intrusion in high speed front end crashes, especially in offset crashes. These crashes can particularly cause intrusion into the toe pan area and result in serious leg injuries. The energy absorbing rails 14, 14" are provided for absorbing some of the kinetic energy of the crash in order to reduce intrusion and the associated injuries. The manner in which the rails 14, 14" absorb kinetic energy is described in detail in the descriptions for FIG. 2.

Figure 2:
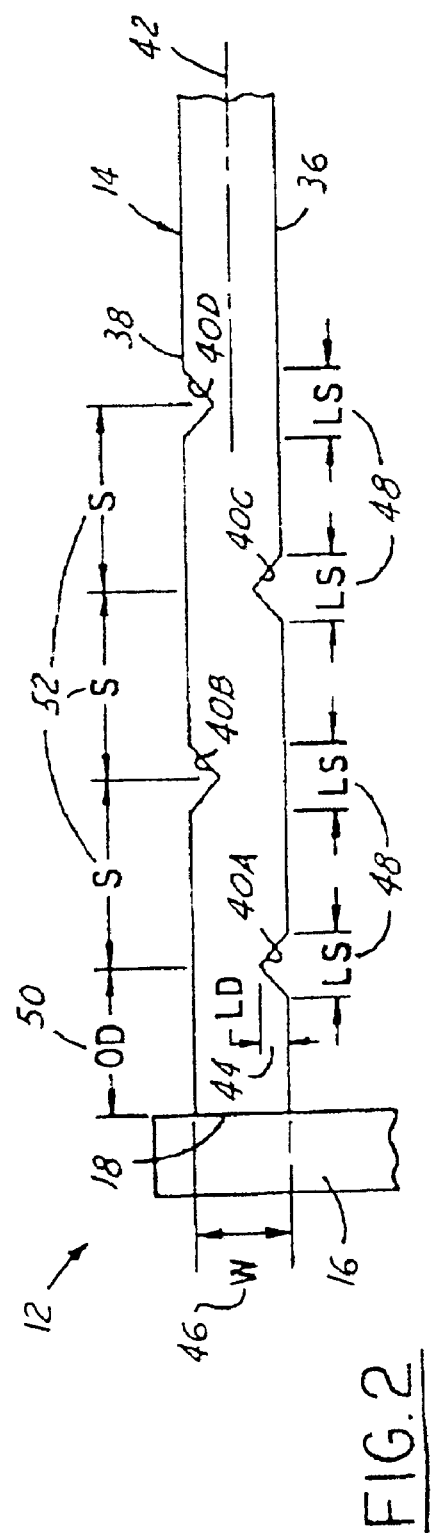
FIG. 2 is a top view of a front portion of a rail for an automotive frame, in accordance with a preferred embodiment of the present invention.

Referring now primarily to FIG. 2, there is shown a plan view of a front portion of a rail 14 for an automotive frame 12, in accordance with a preferred embodiment of the present invention. The rail 14 preferably is a metal bar having an inner side 36 intended to face toward a midline of the vehicle 10 and an outer side 38 intended to face away from the midline of the vehicle 10. The bar may be made of aluminum, steel, or other suitable materials capable of deformation and absorbing kinetic energy of a crash. Both the inner side 36 and the outer side 38 have a plurality of indentations 40A, 40B, 40C, 40D formed therein along a longitudinal axis 42 of the rail 14.

These indentations 40A, 40B, 40C, 40D provide weakened sections of the rail 14 where bending occurs when sufficient force is applied to the rail 14. The extensive bending enhances management of the kinetic energy of a crash. As a person skilled in the art would understand, the kinetic energy of a crash may be used to deform metal within crush zones of the vehicle 10 thereby decreasing the kinetic energy available for causing intrusions into the passenger compartment and any associated injuries.

Thus, the kinetic energy of the crash is used to bend the rail 14 at these indentations 40A, 40B, 40C, 40D, and reduce the kinetic energy available for causing intrusion into the passenger compartment. The rail 14 absorbs sufficient energy and reduces or even completely prevents intrusion into the passenger compartment.

As mentioned above, offset front end crashes are especially known for causing extensive intrusion into the toe pan area. This type of intrusion typically results in serious leg injuries for occupants seated in the front of the vehicle. The rail 14 would absorb sufficient energy to reduce or even prevent intrusion into the toe pan area during front end crashes, including front offset crashes.

Preferably, a first indentation 40A is formed on the inner side 36 adjacent to a front end 18 of the rail 14. The remaining indentations 40B, 40C, 40D preferably alternate between the outer side 38 and the inner side 36 of the rail 14. Although four indentations 40A, 40B, 40C, 40D are shown, it is understood that other numbers of indentations may be provided. Preferably, however, at least two are provided for each rail 14, 14".

The indentations 40A, 40B, 40C, 40D are located on the rail 14 and specifically sized for permitting the rail 14 to bend at those indentations 40A, 40B, 40C, 40D during a front end crash. Each indentation 40A, 40B, 40C, 40D preferably is a V-shaped notch with a lateral depth (LD) 44 equal to about 20% of the width (W) 46 of the rail 14. Although FIG. 2 shows the indentations as a series of V-shaped notches, it is understood that the indentations 40A, 40B, 40C, 40D may be holes or other suitable slits, voids, or other openings for allowing bending.

Each indentation 40A, 40B, 40C, 40D preferably has a longitudinal size (LS) 48 that is inversely proportional to the strength of the material composing the bumper beam 16. For example, an indentation would be dimensioned smaller for a stronger bumper beam 16 than it would be for a weaker bumper beam 16. This relationship minimizes the size of the indentations 40A, 40B, 40C, 40D while permitting a rail 14 on a non-impacted side 78 of the vehicle to be pulled and bent by the bumper beam 16 in a front offset crash (as shown in FIG. 4B).

Preferably, the longitudinal size (LS) 48 does not exceed the value determined by the following equation: $LS \leq 0.8*[(W+H)/2]$ Where: LS=longitudinal size of the indentation W=width of the cross-section of the rail H=height of the cross-section of the rail.

Of course, it is understood that the longitudinal size (LS) 48 may be determined by other desired methods.

An offset distance (OD) 50 between the first indentation 40A and a front end 18 of the rail 14 is approximately equal to the width (W) 46 of the rail 14. However, this distance may be determined otherwise as desired.

The center to center spacing (S) 52 between two consecutive indentations is preferably determined by the same equation used for the longitudinal size (LS) 48 of the indentations. $S=0.8*[(W+H)/2]$ Where: S=center to center spacing W=width of the cross-section of the rail H=height of the cross-section of the rail However, it is also understood that the center to center spacing may be determined by other suitable methods.

These locations and dimensions of the indentations 40A, 40B, 40C, 40D permit the use of rails 14 having various cross-sections. The cross-section preferably is square but may be any suitable shape, such as any other regular polygon, an irregular polygon, a Z-shape, or a various other shapes.

Figure 3A:
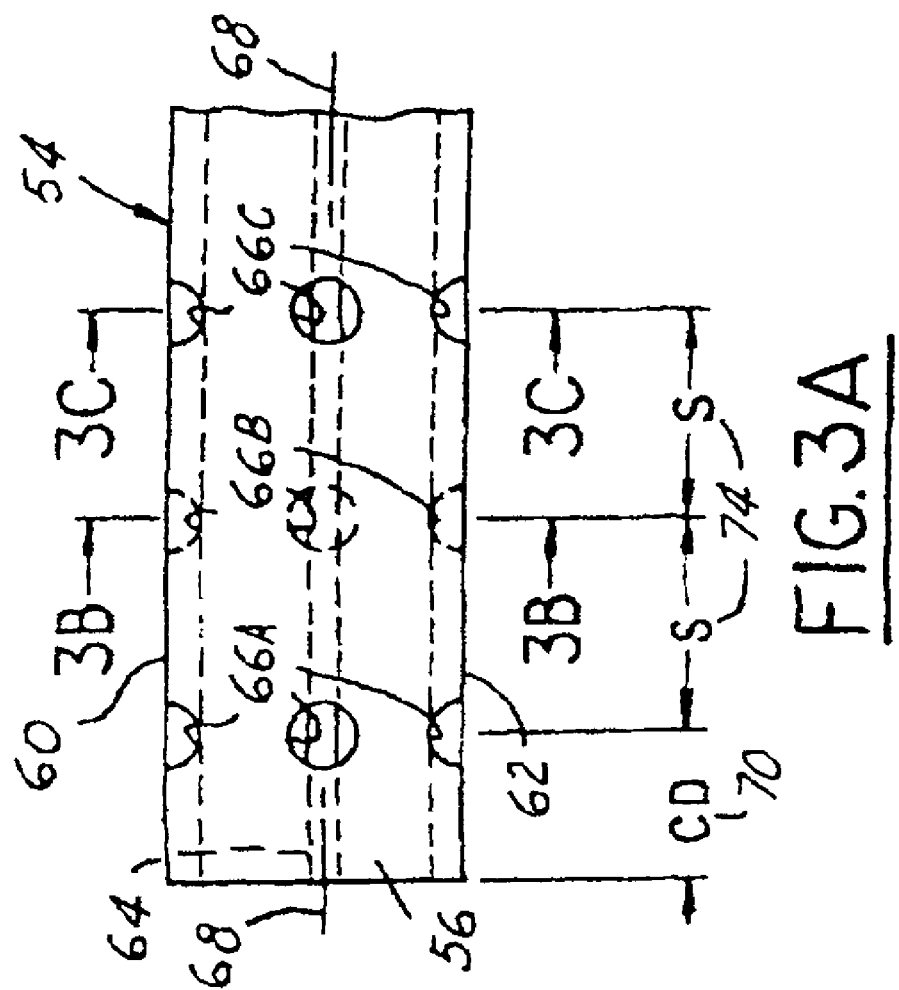
FIG. 3A is a side view of a double cell extruded rail having holes formed therein, in accordance with a preferred embodiment of the present invention.
Figure 3B:
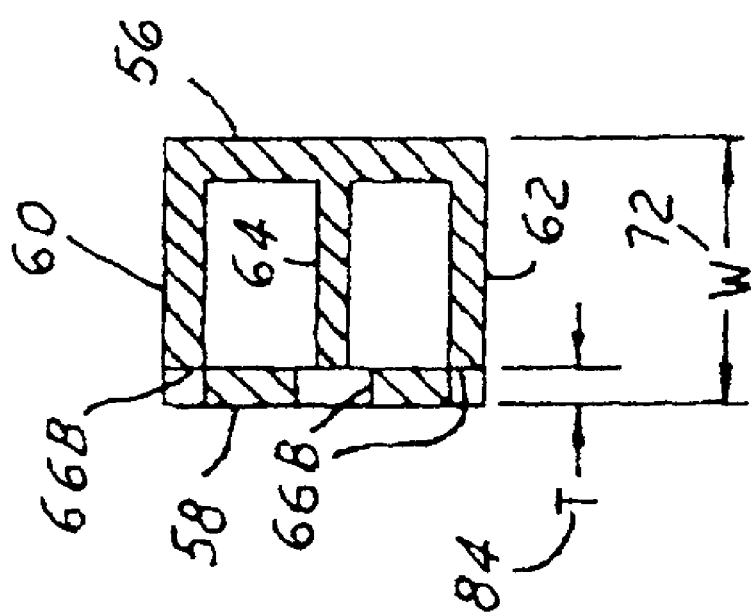
FIG. 3B is a cross-sectional view of the double cell extruded rail as shown in FIG. 3A, the view taken along line 3B—3B in FIG. 3A.

Referring now to FIGS. 3A, 3B, and 3C, in an alternative embodiment, there is shown a double cell extruded rail 54 that exemplifies a rail 54 having a different cross-section and a different type of indentation. The double cell cross-section is defined by an inner side 56, an outer side 58, a top side 60, a bottom side 62, and a middle wall 64 horizontally positioned therebetween.

In this embodiment, the indentations comprise holes 66A, 66B, 66C formed within both the inner side 56 and the outer side 58 along the longitudinal axis 68 of the rail 54. These holes 66A, 66B, 66C may alternate between the inner side 56 and the outer side 58 (as best shown in FIGS. 3B and 3C) with the first holes 66A being formed within the inner side 56.

Furthermore, the holes 66A, 66B, 66C may be positioned across the height of the rail 54 at a particular point along the rail"s longitudinal axis 68. For example, there may be three holes arranged vertically at a particular point along the rail"s longitudinal axis 68. These holes 66A, 66B, 66C may be circular or semicircular with diameters that are determined by the following equation: $\phi \leq A/(5*N*T)$ Where: φ=diameter of the hole A=area of the cross-section of the rail N=number of holes at a particular section of the rail along its longitudinal axis T=thickness of the wall having the hole formed therein.

For example, a rail having a cross-sectional area of 540 millimeters square, a wall thickness (T) 84 of 3 millimeters, and 3 holes formed within a particular section along the longitudinal axis 68 preferably requires holes with diameters less than or equal to 12 millimeters.

Of course, the shape and size of the holes 66A, 66B, 66C may be determined by other suitable methods.

Similar to the preferred embodiment, the first holes 66A are positioned at an offset distance (OD) 70 from a front end 18 of the rail 54 approximately equal to the width (W) 72 of the rail 54. Furthermore, the center to center spacing (S) 74 between two consecutive holes along the longitudinal axis 68 preferably is determined by the same equation used for the preferred embodiment. Of course, it is understood that the center to center spacing (S) 74 may be determined by other suitable methods.

Figure 4A:
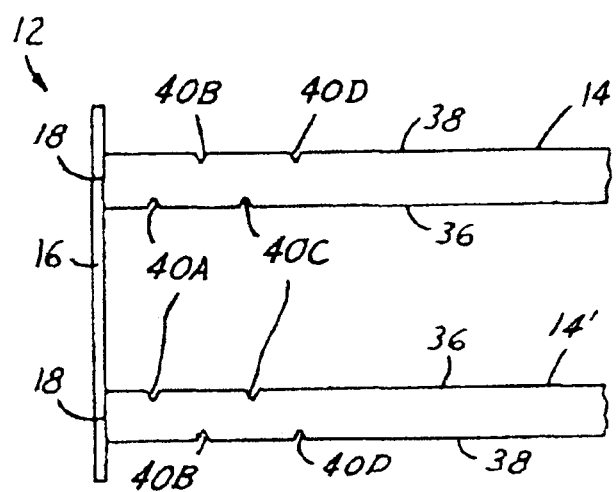
FIG. 4A is a top view of a front portion of an automotive frame having two rails with indentations formed therein, in accordance with a preferred embodiment of the present invention.

Referring primarily to FIGS. 4A and 4B, there are shown, respectively, plan views of the automotive frame 12 before and after a 40% offset crash. The indentations 40A, 40B, 40C, 40D permit the rail 14" located on an impacted side 76 of the vehicle to be crushed axially. Crushing the rail 14" axially requires substantial deformation of the rail 14" and consequently absorbs significant kinetic energy from the crash.

In addition, the indentations 40A, 40B, 40C, 40D also permit the rail 14 located on a non-impacted side 78 to bend as it is being pulled by the bumper beam 16 connecting the rails 14, 14" together. Bending of this rail 14 absorbs additional energy from the crash.

The triggered bending of both rails 14, 14" may increase crash energy absorption by about 15%. For example, an automotive frame having conventional rails without indentations 40A, 40B, 40C, 40D formed therein may absorb about 497,000 lbf-in in a 40% offset crash. On the other hand, a similar automotive frame 12 having rails 14, 14" with indentations 40A, 40B, 40C, 40D formed therein may absorb about 570,000 lbf-in.

Figure 5:
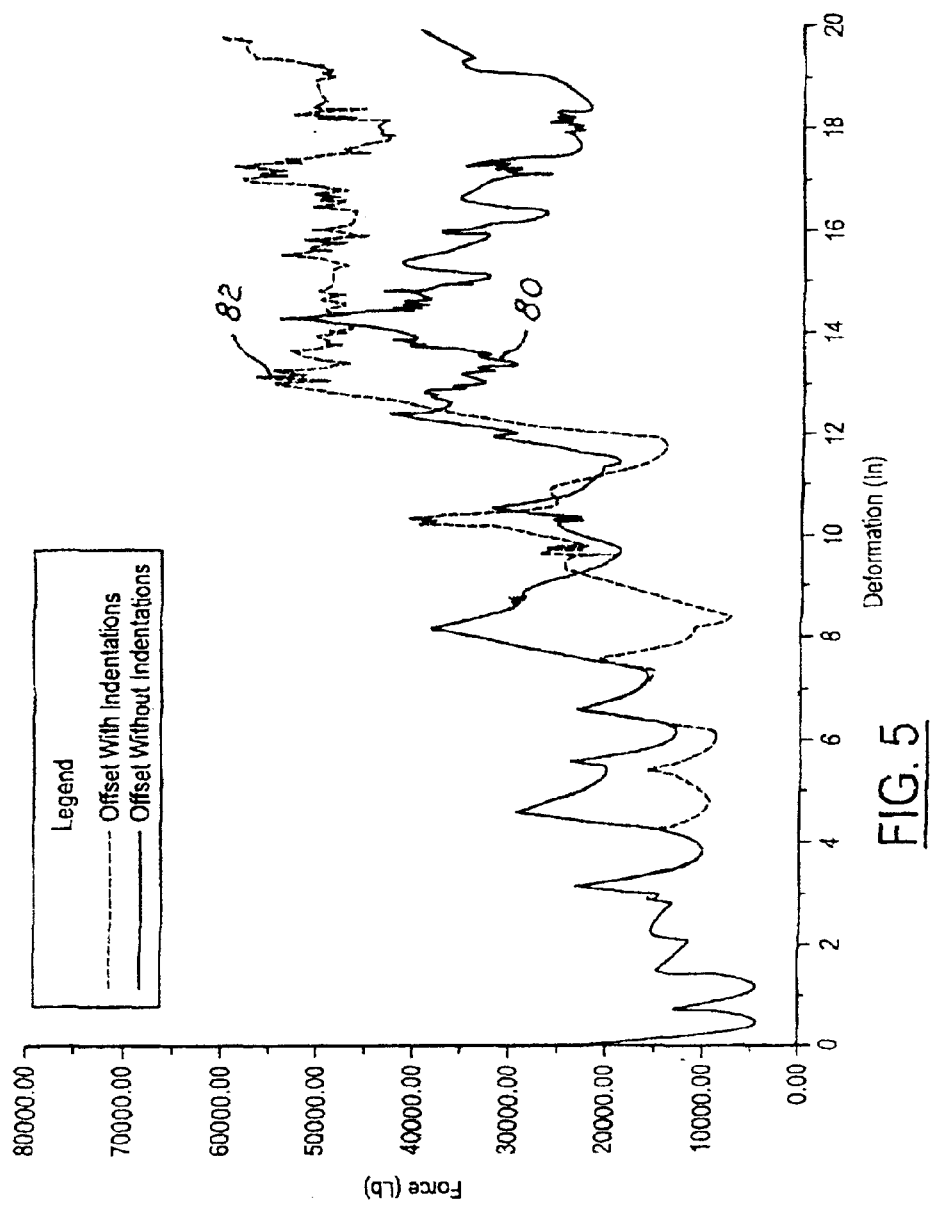
FIG. 5 is a graph illustrating typical force-deformation responses of both a conventional rail lacking indentations and a rail having indentations formed therein, in accordance with a preferred embodiment of the present invention.

FIG. 5 is a graph illustrating typical force-deformation responses of both a conventional rail without indentations formed therein and a rail 14 having indentations 40A, 40B, 40C, 40D formed therein. A solid curve 80 shows the force-deformation response of the rail lacking indentations. Likewise, a dashed curve 82 shows the force-deformation response of the rail 14 having indentations 40A, 40B, 40C, 40D formed therein. Each curve 80, 82 represents the amount of force that can be exerted on the respective rail 14 before further deformation can occur.

The graph shows that the rail 14 having indentations 40A, 40B, 40C, 40D can exert more force than the rail lacking indentations. As a result, more kinetic energy from the crash is absorbed by the rail 14 having indentations 40A, 40B, 40C, 40D.

It is also understood that, in addition to offset front end crashes, the rails 14, 14" will also absorb kinetic energy in other crash-type situations, such as full front end crashes. In this regard, both rails 14, 14" may absorb energy by being crushed axially or by being simultaneously crushed axially and bent towards or away a midline of the vehicle.

While particular embodiments of the invention have been shown and described, numerous variations and alternate embodiments will occur to those skilled in the art. Accordingly, it is intended that the invention be limited only in terms of the appended claims.

What is claimed is:

1. A rail for an automotive frame comprising:
   a metal bar having an inner side and an outer side with a plurality of indentations integrally formed along a longitudinal axis of said metal bar, said plurality of indentations alternating between said inner side and said outer side, said plurality of indentations intended to trigger deformation of said bar so as to absorb kinetic energy during a front end crash.

2. The rail of claim 1 wherein a first indentation of said plurality of indentations is formed within said inner side of said metal bar adjacent to a bumper beam attached to said metal bar.

3. The rail of claim 1 wherein each of said plurality of indentations comprises a V-shaped notch in said metal bar, said V-shaped notch having a lateral depth equal to about 20% of a width of said metal bar.

4. The rail of claim 1 wherein said metal bar comprises a double cell extruded bar having a middle wall positioned between a top side and a bottom side of said double cell extruded bar, said plurality of indentations comprising a plurality of holes formed through at least one of said inner side and said outer side, each of said plurality of holes having a diameter that is less than or equal to a cross-sectional area of said double cell extruded bar divided by a product of 5 multiplied by a width of said metal bar that is multiplied by a number of said plurality of holes.

5. The rail of claim 1 wherein each of said plurality of indentations are spaced apart from each other at a distance equal to a product of 0.8 multiplied by half of a sum of a height and a width of said metal bar.

6. The rail of claim 1 wherein a cross-section of said metal bar has a shape selected from the group consisting of a regular polygon, an irregular polygon, and a Z-shape.

7. The rail of claim 1 wherein said metal bar is made of a material selected from the group consisting of aluminum and steel.

8. An automotive frame comprising:
   a first rail;
   a second rail;
   wherein both said first rail and said second rail each include: an inner side and an outer side, a plurality of indentations integrally formed along a longitudinal axis thereof, said plurality of indentations alternating between said inner side and said outer side, said plurality of indentations intended to trigger deformation so as to absorb kinetic energy during a front end crash; and
   at least one cross member attaching together said first rail and said second rail.

9. The rail of claim 8 wherein each of said plurality of indentations are spaced apart from each other at a distance equal to a product of 0.8 multiplied by half of a sum of a height and a width of said metal bar.

10. The rail of claim 8 wherein said plurality of indentations comprises a V-shaped notch, said V-shaped notch having a lateral depth equal to about 20% of a width of at least one of said first rail and said second rail.

11. A rail for an automotive frame comprising:
    a metal bar having a front portion with an inner side and an outer side, said front portion having a plurality of indentations integrally formed therein along a longitudinal axis of said metal bar, said plurality of indentations alternating between said inner side and said outer side, said plurality of indentations intended to trigger deformation of said metal bar so as to absorb kinetic energy during a front end crash.

12. The rail of claim 11 wherein each of said plurality of indentations comprises a V-shaped notch in said metal bar.

13. The rail of claim 11 wherein a cross-section of said metal bar has a shape selected from the group consisting of a regular polygon, an irregular polygon, and a Z-shape.

14. The rail of claim 11 wherein said metal bar is made of material selected from the group consisting of aluminum and steel.

15. A rail for an automotive frame comprising:
    a metal bar having a front portion with an inner side and an outer side, said front portion having a plurality of indentations integrally formed therein along a longitudinal axis of said metal bar, said plurality of indentations alternating between said inner side and said outer side, said plurality of indentations intended to trigger deformation of said metal bar so as to absorb kinetic energy during a front end crash;
    wherein a first indentation of said plurality of indentations is formed within said inner side of said metal bar adjacent to a bumper beam attached to said metal bar.

16. A rail for an automotive frame comprising:
    a metal bar having a front portion with an inner side and an outer side, said front portion having a plurality of indentations integrally formed therein along a longitudinal axis of said metal bar, said plurality of indentations intended to trigger deformation of said metal bar so as to absorb kinetic energy during a front end crash;

wherein said metal bar comprises a double cell extruded bar having a middle wall positioned between a top side and a bottom side of said double cell extruded bar, said plurality of indentations comprising a plurality of holes formed through at least one of said inner side and said outer side.

17. A rail for an automotive frame comprising:

a metal bar having a front portion with an inner side and an outer side, said front portion having a plurality of indentations integrally formed therein along a longitudinal axis of said metal bar, said plurality of indentations intended to trigger deformation of said metal bar so as to absorb kinetic energy during a front end crash;

wherein said metal bar comprises a double cell extruded bar having a middle wall positioned between a top side and a bottom side of said double cell extruded bar, said plurality of indentations comprising a plurality of holes formed through at least one of said inner side and said outer side, each of said plurality of holes having a diameter that is equal up to a cross-sectional area of said metal bar divided by a product of 5 multiplied by a thickness of said metal bar that is multiplied by a number of said plurality of holes.

* * * * *